(12) United States Patent
Lin (10) Patent No.: US 10,890,216 B2
(45) Date of Patent: Jan. 12, 2021

(54) TORQUE LIMITER, PRINTER AND GEAR-SET

(71) Applicant: ARGOX INFORMATION CO., LTD., New Taipei (TW)

(72) Inventor: Sheng-Chih Lin, New Taipei (TW)

(73) Assignee: ARGOX INFORMATION CO., LTD., New Taipei (TW)

( * ) Notice: Subject to any disclaimer, the term of this patent is extended or adjusted under 35 U.S.C. 154(b) by 1437 days.

(21) Appl. No.: 14/960,436

(22) Filed: Dec. 6, 2015

(65) Prior Publication Data

US 2017/0051794 A1 Feb. 23, 2017

(30) Foreign Application Priority Data

Aug. 19, 2015 (TW) .............................. 104127073 A (51) Int. Cl.
| | |
|---|---|
| *F16D 7/02* | (2006.01) |
| *B41J 35/08* | (2006.01) |
| *B41J 33/22* | (2006.01) |
| *F16H 1/20* | (2006.01) |
| *F16D 47/02* | (2006.01) |

(52) U.S. Cl.
CPC .............. *F16D 7/025* (2013.01); *B41J 33/22* (2013.01); *B41J 35/08* (2013.01); *F16D 7/021* (2013.01); *F16D 47/02* (2013.01); *F16H 1/20* (2013.01)

(58) Field of Classification Search
CPC ............ F16D 7/025; B41J 35/08; B41J 33/22
See application file for complete search history.

(56) References Cited

U.S. PATENT DOCUMENTS

| | | | | |
|---|---|---|---|---|
| 3,681,940 A * | 8/1972 | Albrile | ...................... | B41J 11/24 464/31 |
| 4,043,149 A * | 8/1977 | Tuninetti | ................ | F16D 7/025 464/46 |
| 4,422,589 A * | 12/1983 | Okada | ...................... | F16D 7/025 242/534 |
| 4,840,259 A * | 6/1989 | Guslits | .................... | F16D 1/101 192/108 |
| 5,094,555 A * | 3/1992 | Suzaki | ...................... | B41J 35/08 400/208 |
| 5,297,879 A * | 3/1994 | Oikawa | ..................... | B41J 35/08 400/234 |
| 5,478,159 A * | 12/1995 | Schneider | ................... | B41J 2/32 192/56.1 |
| 5,820,279 A | 10/1998 | Lodwig | | |
| 5,995,128 A | 11/1999 | Adams | | |
| 6,637,957 B2 | 10/2003 | Mastinick | | |
| 6,753,894 B2 * | 6/2004 | Yoshida | .................... | B41J 2/325 347/217 |

(Continued)

FOREIGN PATENT DOCUMENTS

| | | |
|---|---|---|
| CN | 101636595 A | 1/2010 |
| CN | 102576205 A | 7/2012 |

(Continued)

*Primary Examiner* — William Kelleher
*Assistant Examiner* — Gregory T Prather
(74) *Attorney, Agent, or Firm* — Anna Tsang (57) ABSTRACT

The present application provides a torque limiter which includes a first torque limiting module for limiting a first torque with regard to a rotating direction and a second torque limiting module for limiting a second torque with regard to a counter direction of the rotating direction.

14 Claims, 11 Drawing Sheets

(56) References Cited

U.S. PATENT DOCUMENTS

| | | | | |
|---|---|---|---|---|
| 7,175,570 B2* | 2/2007 | Lull | ................... | A63B 21/157 |
| | | | | 482/57 |
| 7,413,530 B2* | 8/2008 | Warner | ................... | B62M 1/10 |
| | | | | 482/57 |
| 7,559,710 B2* | 7/2009 | Ono | ................... | B41J 17/10 |
| | | | | 192/56.6 |
| 9,221,643 B2* | 12/2015 | Nakano | ................... | B65H 31/02 |
| 2010/0078284 A1 | 4/2010 | Nilsson et al. | | |

FOREIGN PATENT DOCUMENTS

| | | |
|---|---|---|
| CN | 203805524 U | 9/2014 |
| CN | 102576205 B | 6/2015 |
| TW | 580453 B | 3/2004 |
| TW | 200500221 A | 1/2005 |

\* cited by examiner

TORQUE LIMITER, PRINTER AND GEAR-SET

FIELD OF INVENTION

This invention relates to a torque limiter, more particularly, to a torque limiter including two independent torque limiting module which are used in a printer.

BACKGROUND

The printer is an indispensable business machine in modern industry, on many commercial applications, it is easy to recognize and track the processes of purchase, sales and inventory by printing barcode and pasting on the product. Barcode printer is a kind of printer which uses carbon belt or ribbon, and the main working principles is that the word or image can be transferred to the paper through printer head heating the carbon belt or ribbon. For convenience, this application will use ribbon to cover the meaning of color band and carbon belt.

Figure 1:
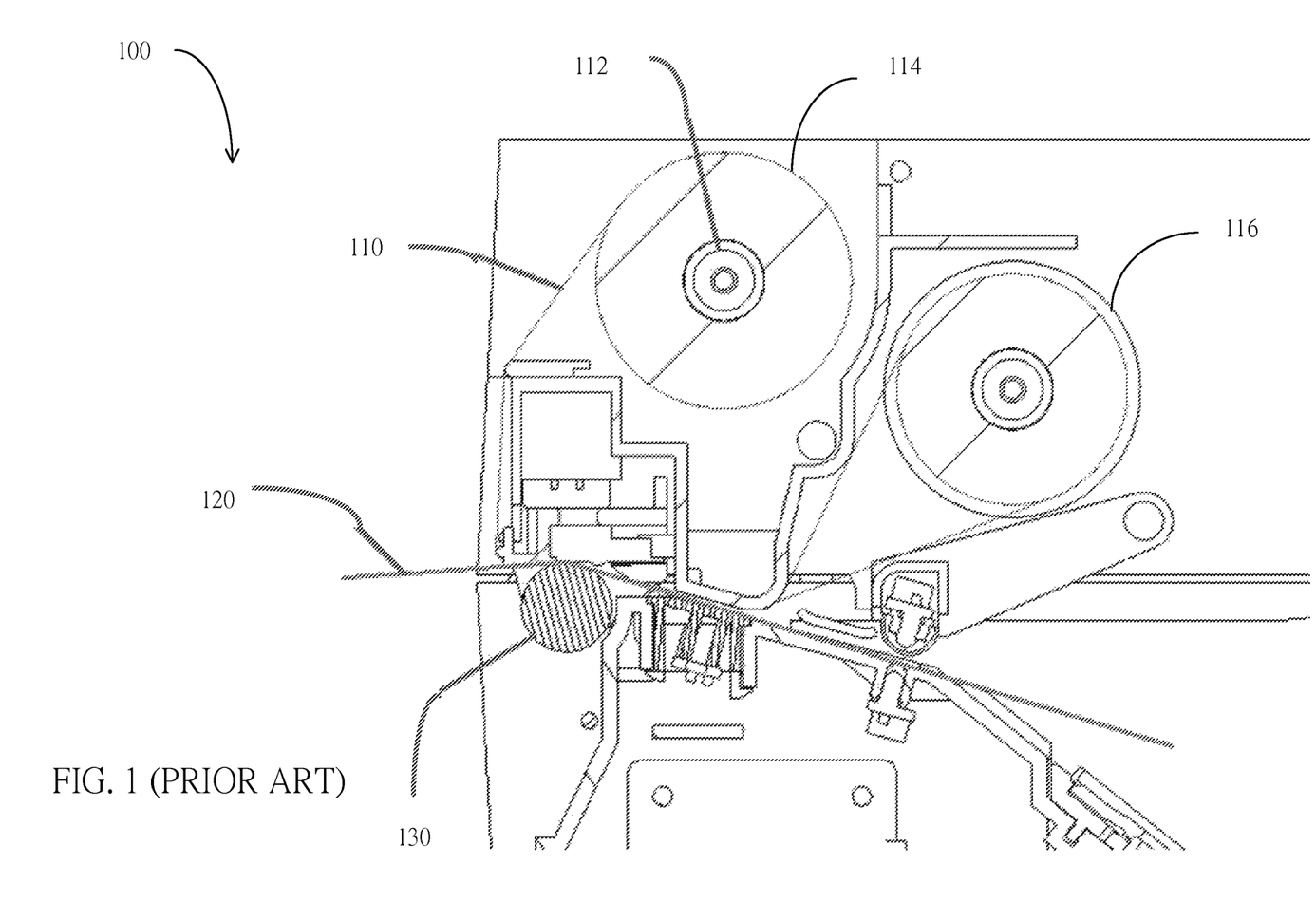
FIG. 1 is diagrammatic cross-section section of a part of the printer 100.

As depicted in FIG. 1, the diagrammatic cross-section of traditional printer 100 comprises a ribbon 110 that connects to a recycling wheel 114 and an unlocking wheel 116, separately. The axial core of the recycling wheel 114 is equipped with at least one torque limiter 112. The printer 100 also has a paper 120 and a platen 130.

When the platen 130 rotates in a counter-clockwise direction, it can mobilize the paper 120 move to the left. The print head of the printer 100 heats at the ribbon 110 to the paper 120, so that the text or image can print to the paper 120. When the print head does not move, the ribbon 110 connected to the recycling wheel 114 and the unlocking wheel 116 must have proper tension for avoiding the ribbon 110 too loose to touch the paper 120, and it also can avoid the torsion of the recycling wheel too large to strand the ribbon 110, these can maintain the quality of the printing. The torque limiter 112 is used to limit the torsion of the ribbon 110 when the recycling wheel 114 rotates clockwise, which make the proper tension of the ribbon 110 in the forward and not broken.

The tradition torque limiter 112 only has single torsion limit value which can be used to the paper 120 when moving to the left. However, when the paper 120 move to the right of the FIG. 1, the above-mentioned single torque limiter 112 generates the tension of the ribbon 110 that is not suitable and causes the friction between the ribbon 110 and the paper 120, which lead to the appearance of the unwanted colour on the paper 120.

Besides, the axis of the tradition torque limiter 112 and the recycling wheel 114 is the same module, and the module of the recycling wheel 114 and other components have close connection. Once the torque limiter 112 goes wrong or the parts aging causing the malfunction and error, the maintenance personnel can't have the real-time maintenance on the client side. After having the dismantlement of the printer 100 can change the torque limiter 112. These repair processes not only consume the time, but also dismantle the whole printer 100 for maintenance.

Above all, we need a modularized torque limiter urgently. It can provide the proper tension when the paper back and avoid the pollution on the paper. In addition, the torque limiter can be disassembled and changed simply without sending the whole printer for maintenance.

SUMMARY OF INVENTION

According to one embodiment of the present invention provides a torque limiter which includes a first torque limiting module for limiting a first torque with regard to a rotating direction and a second torque limiting module for limiting a second torque with regard to a counter direction of the rotating direction.

According to one embodiment of the present invention provides a printer which comprises a ribbon recycling wheel, a torque limiter connected with the ribbon recycling wheel, a gear-set including a swinging gears, a driving gear driven by the gear set. The torque limiter also comprises a first torque limiting module for limiting a first torque with regard to a rotating direction and a second torque limiting module for limiting a second torque with regard to a counter direction of the rotating direction. When the driving gear drives the gear-set in one driving direction, the swinging gear is coupled to the first torque limiting module, making the ribbon recycling wheel limited by the first torsion. When the driving gear drives the gear-set in the opposite of the driving direction, the swinging gear separates from the first torque limiting module, making the ribbon recycling wheel limited by the second torsion.

According to one embodiment of the present invention provides a gear-set inside the printer, which is connected to the torque limiter of the ribbon recycling. This torque limiter has a first torque limiting module for limiting a first torque with regard to a rotating direction and a second torque limiting module for limiting a second torque with regard to a counter direction of the rotating direction. The gear-set includes a swinging gear, when a driving gear drives the gears in a driving direction, the swinging gear is coupled to the first torque limiting module, making the ribbon recycling wheel limited by the first torsion. When the driving gear drives the gear-set in the opposite of the driving direction, the swinging gear separates from the first torque limiting module, making the ribbon recycling wheel limited by the second torsion.

Therefore, this application provides a modularization of torque limiter and the printer with the torque limiter and its gear-set. Make it have the tension of the ribbon when the paper back and avoid the colour polluting on the paper. Besides, when the maintenance personnel find it goes wrong, they can remove and replace the torque limiter simply without sending the whole printer for maintenance.

DETAILED DESCRIPTION

EXAMPLES

The present invention will be further described by the following embodiments. While certain embodiments will be shown and described, various modifications and substitutions may be made thereto without departing from the spirit and scope of the invention. Accordingly, it is to be understood that the present invention is described by way of illustration and not limitations. In order to provide a more clear description of the invention and make the common technical personnel understand the contents of the invention, each part of the figures may not be drawn according to their relative size, the proportion of certain size and other relevant scale may be exaggerated, and the details of the non-correlation may be omitted and not be fully drawn, in order to be concise.

Figure 3A:
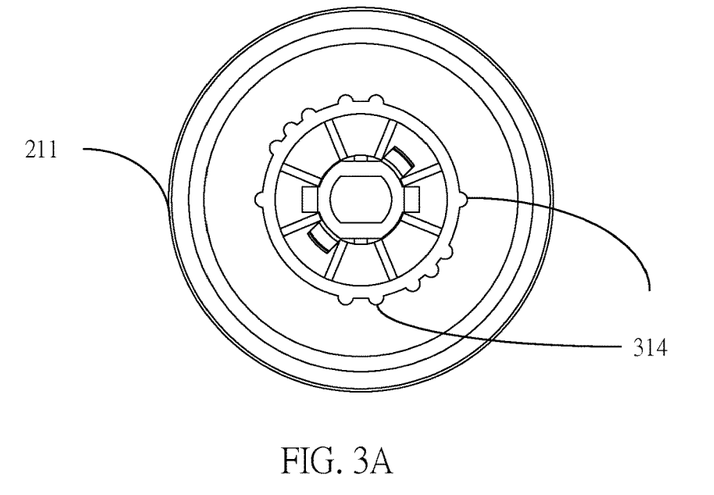
FIGS. 3A, 3B, 3C and 3D is the bottom view, the front view, the side view and the space diagram of the first torque limiting module 300 and the intermediate connecting member 210, respectively.
Figure 3B:
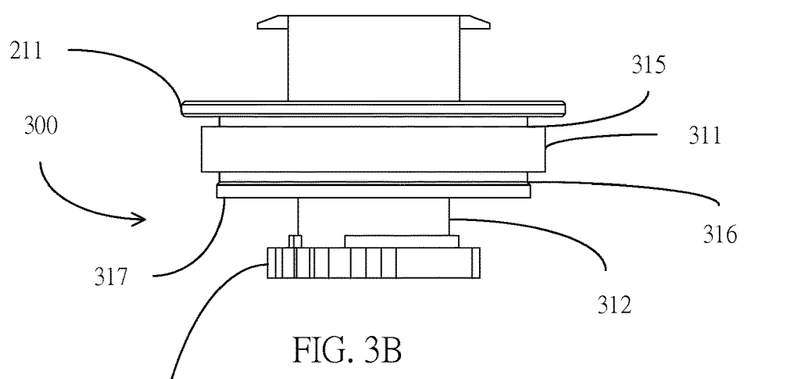
Figure 3C:
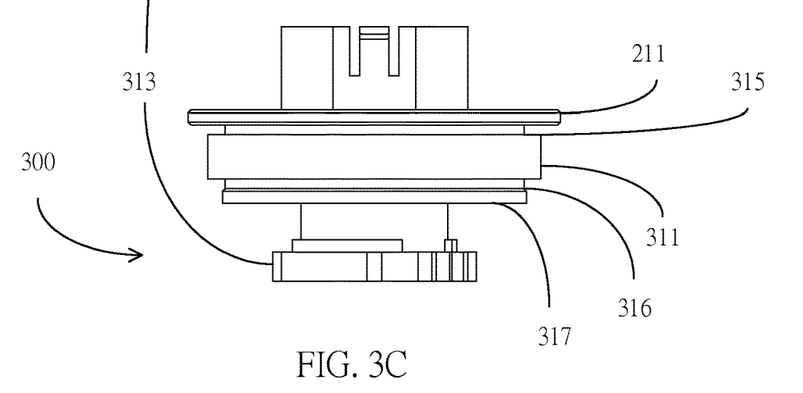
Figure 3D:
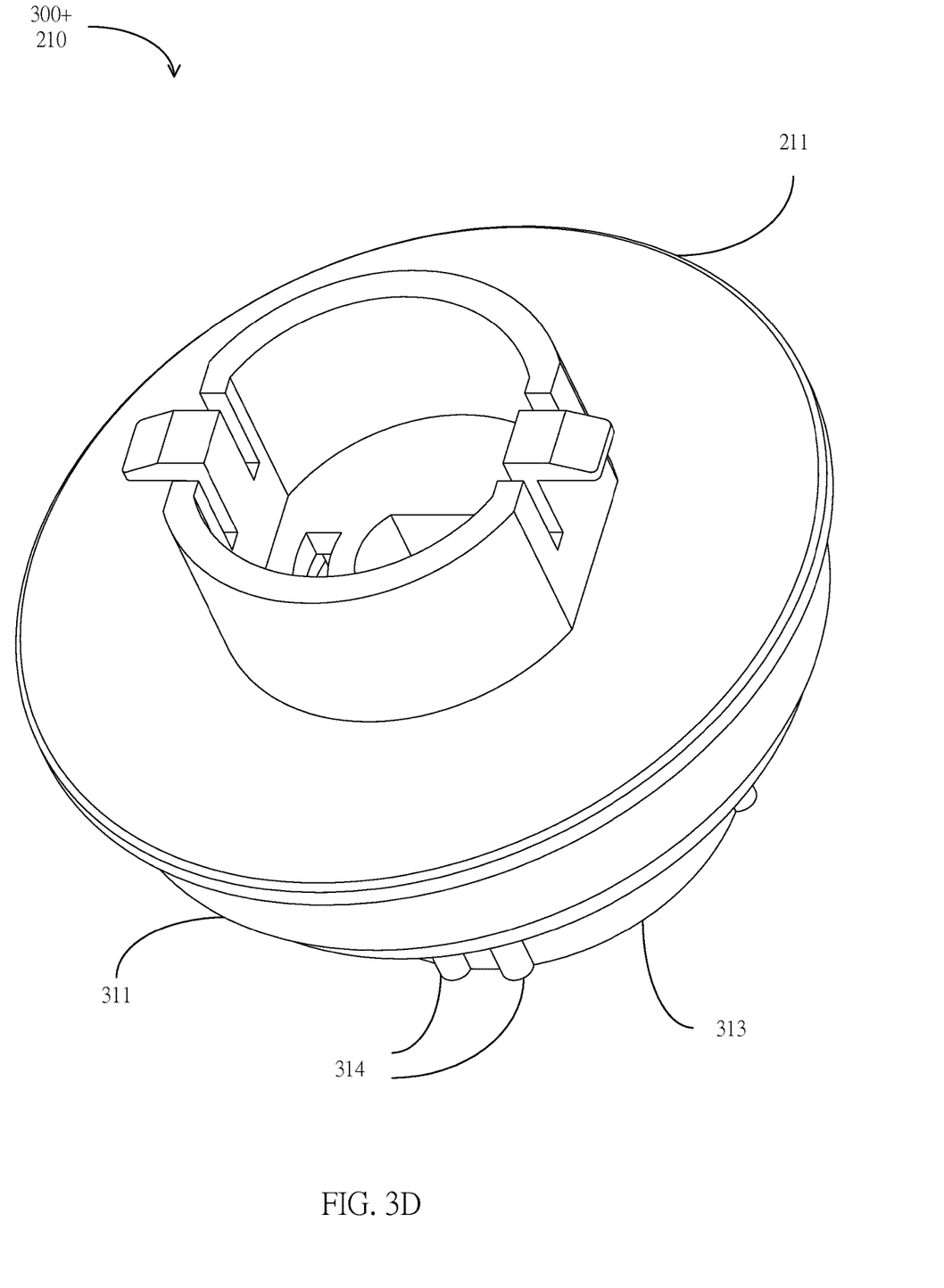
Figure 4A:
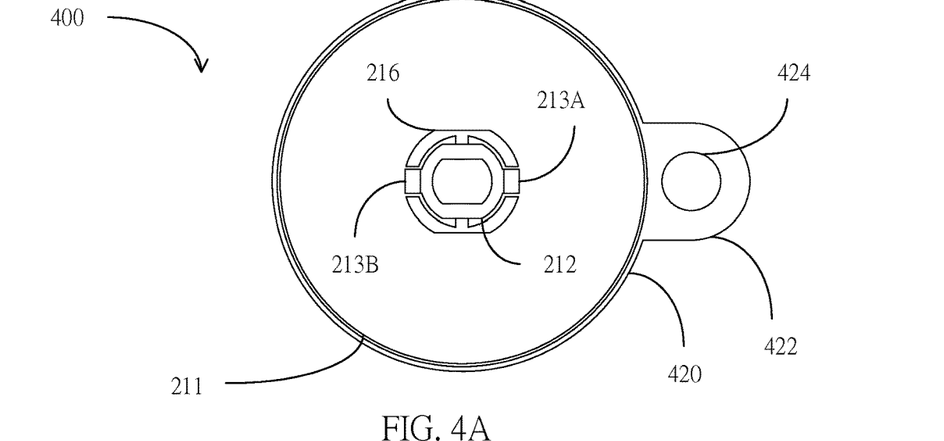
FIGS. 4A, 4B, 4C, 4D and 4E is the bottom view, the front view, the side view and the space diagram of the second torque limiting module 400 and the intermediate connecting member 210, respectively.
Figure 4B:
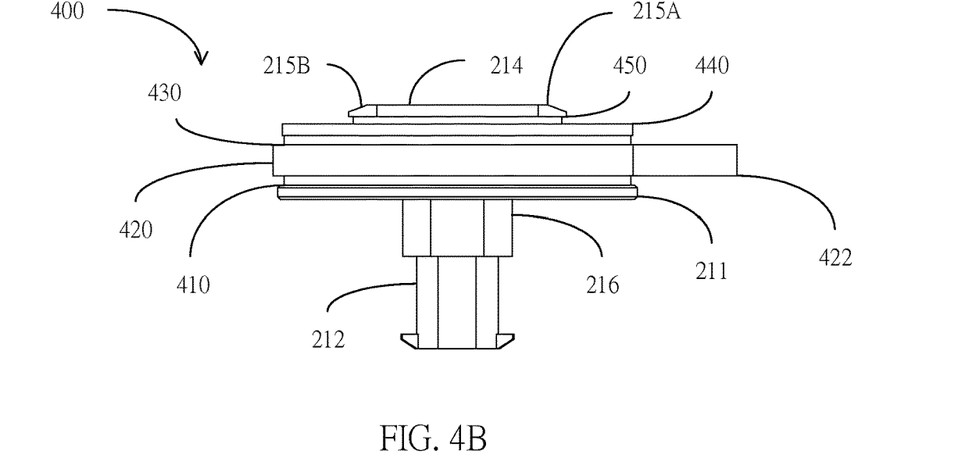
Figure 4C:
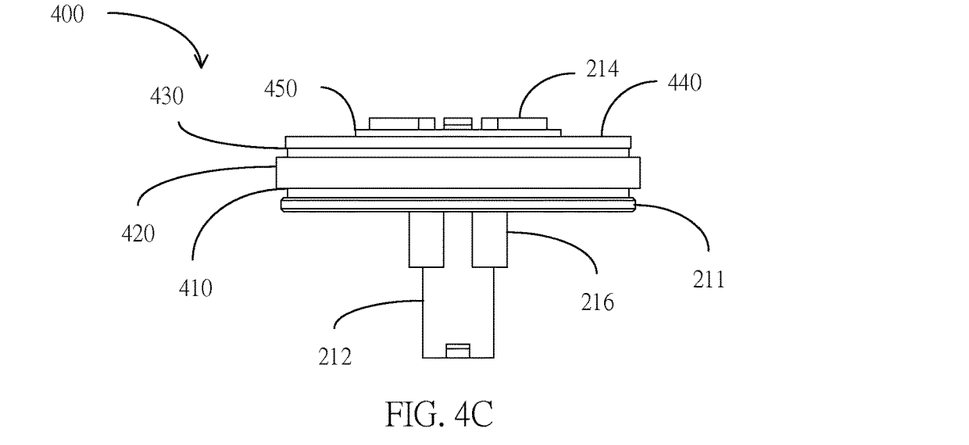
Figure 4D:
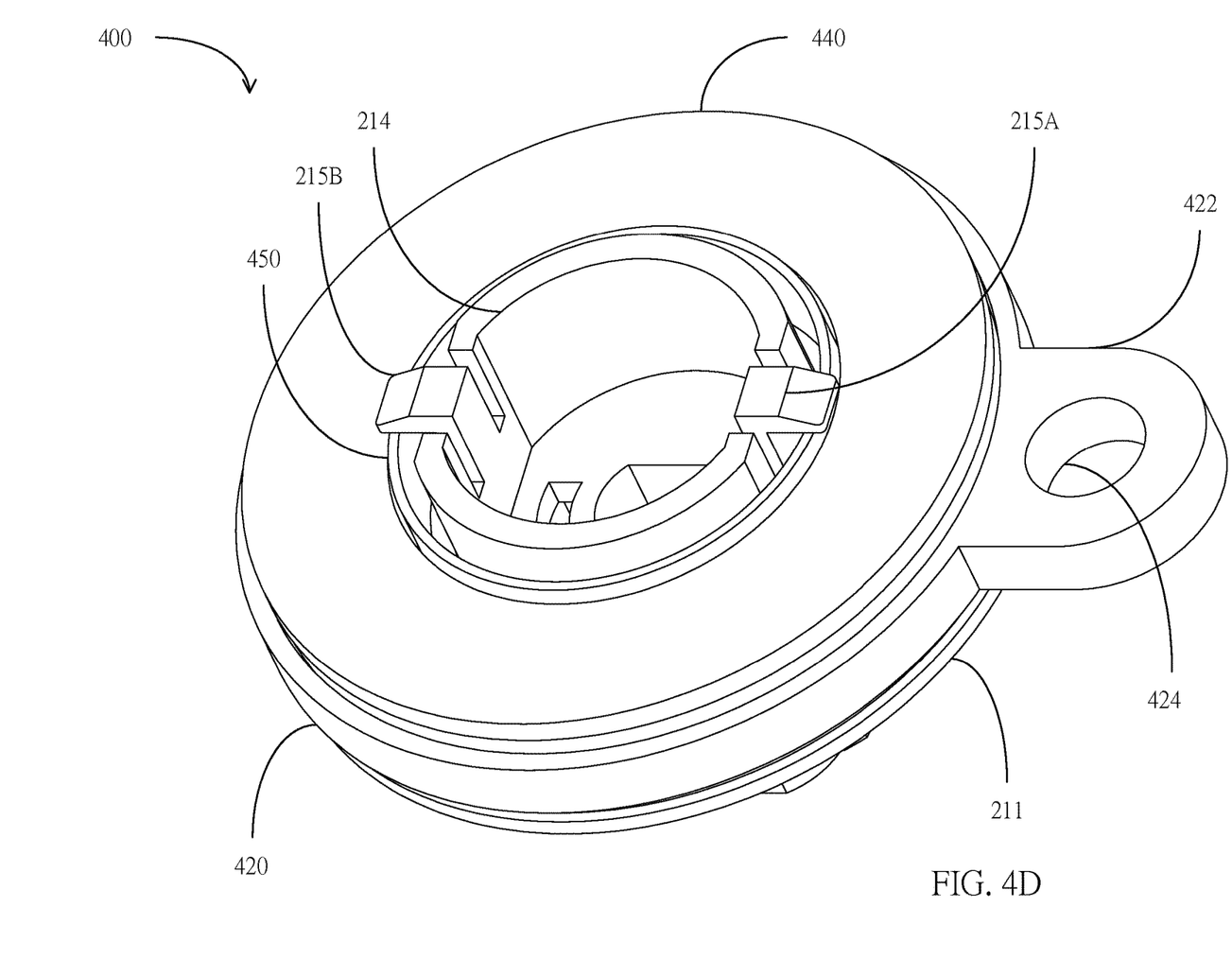
Figure 4E:
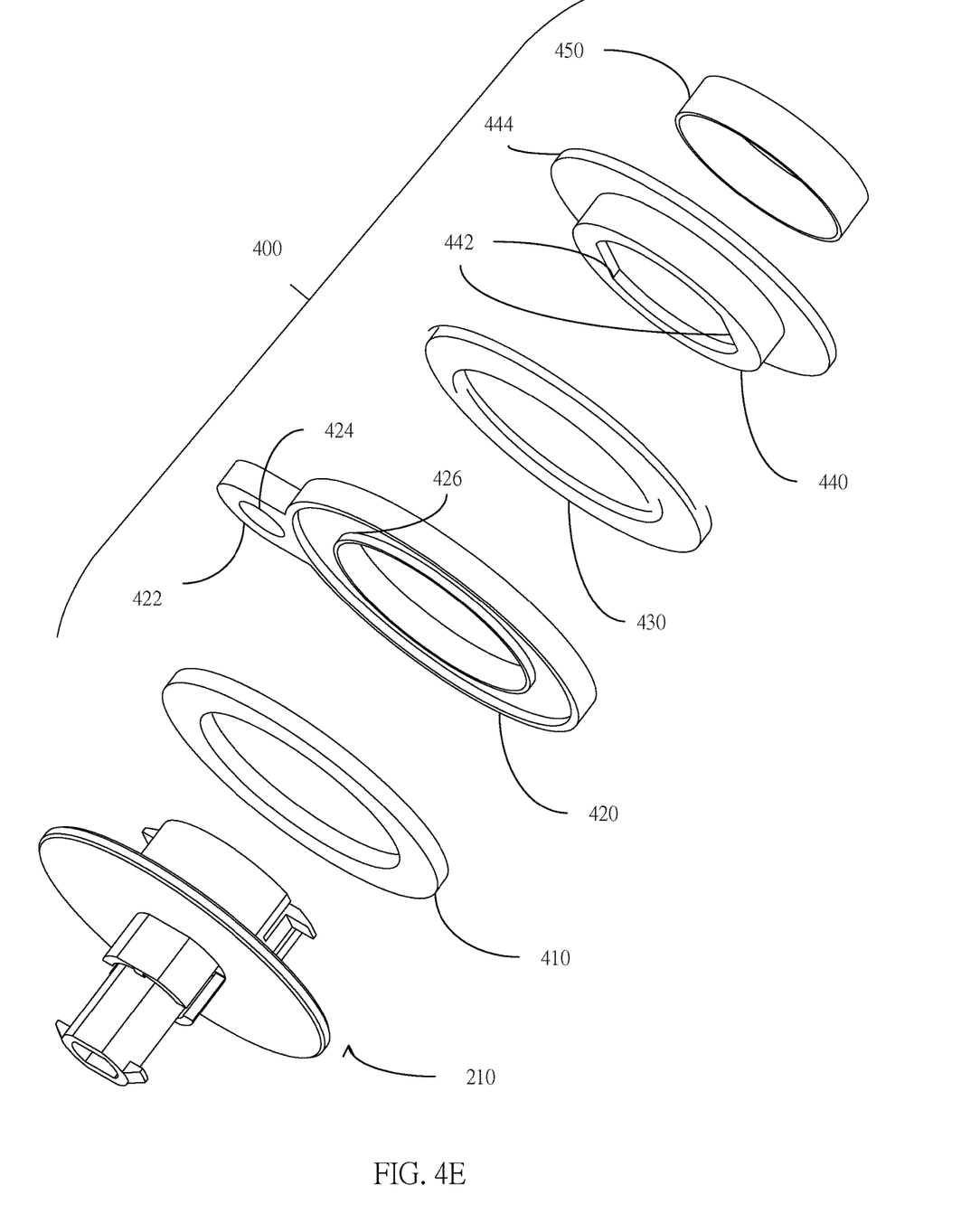

Referring to FIGS. 2A, 2B, 2C and 2D, this is the bottom view, the front view, the side view and the space diagram of the torque limiter 200, respectively. In one example, the torque limiter 200 can be mounted on the axis of the recycling wheel of the ribbon. From FIGS. 2B and 3B, the torque limiter 200 comprises the intermediate connecting member 210, which is used to connect the first torque limiting module 300 below and the second torque limiting module 400 above.

Figure 2A:
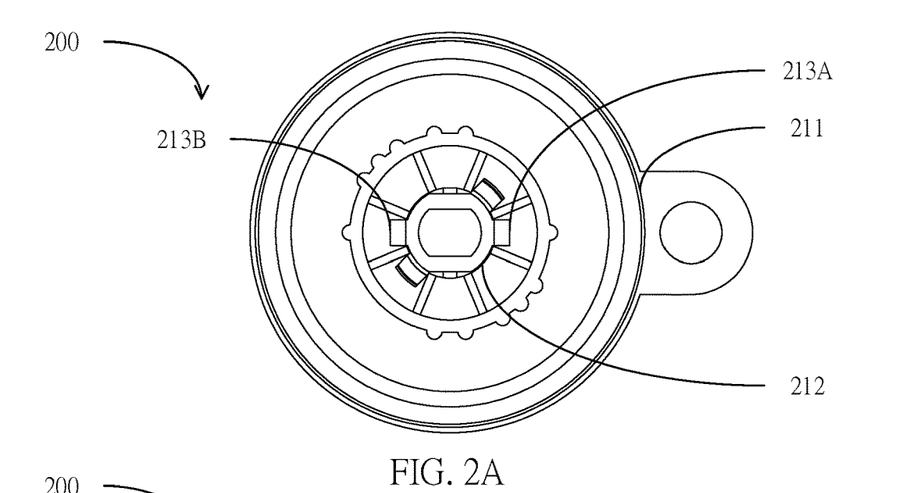
FIGS. 2A, 2B, 2C and 2D is the bottom view, the front view, the side view and the space diagram of the torque limiter 200, respectively.
Figure 2B:
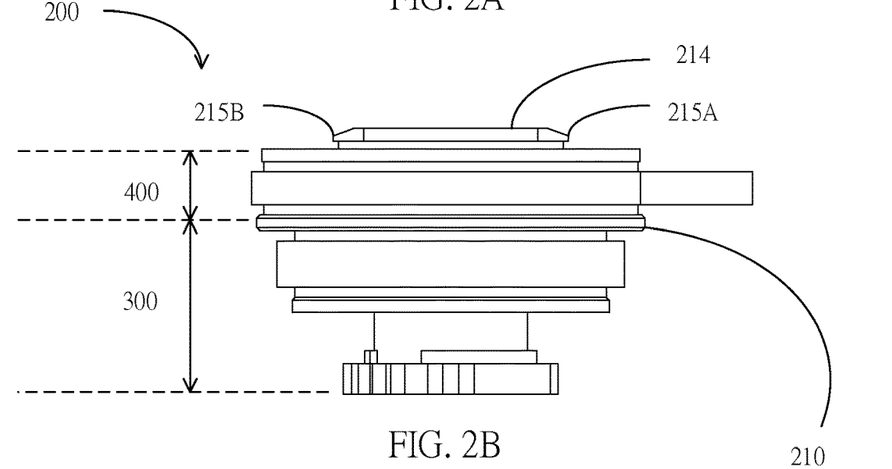
Figure 2C:
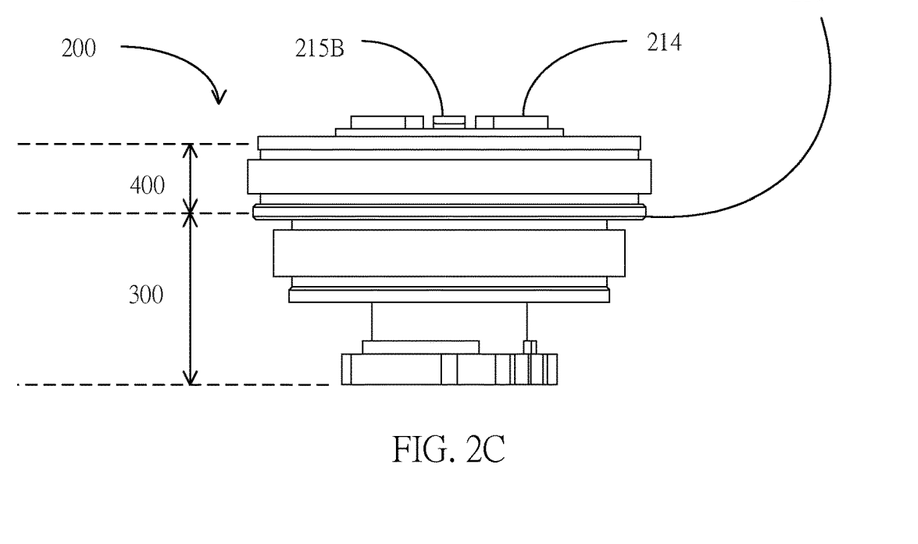
Figure 2D:
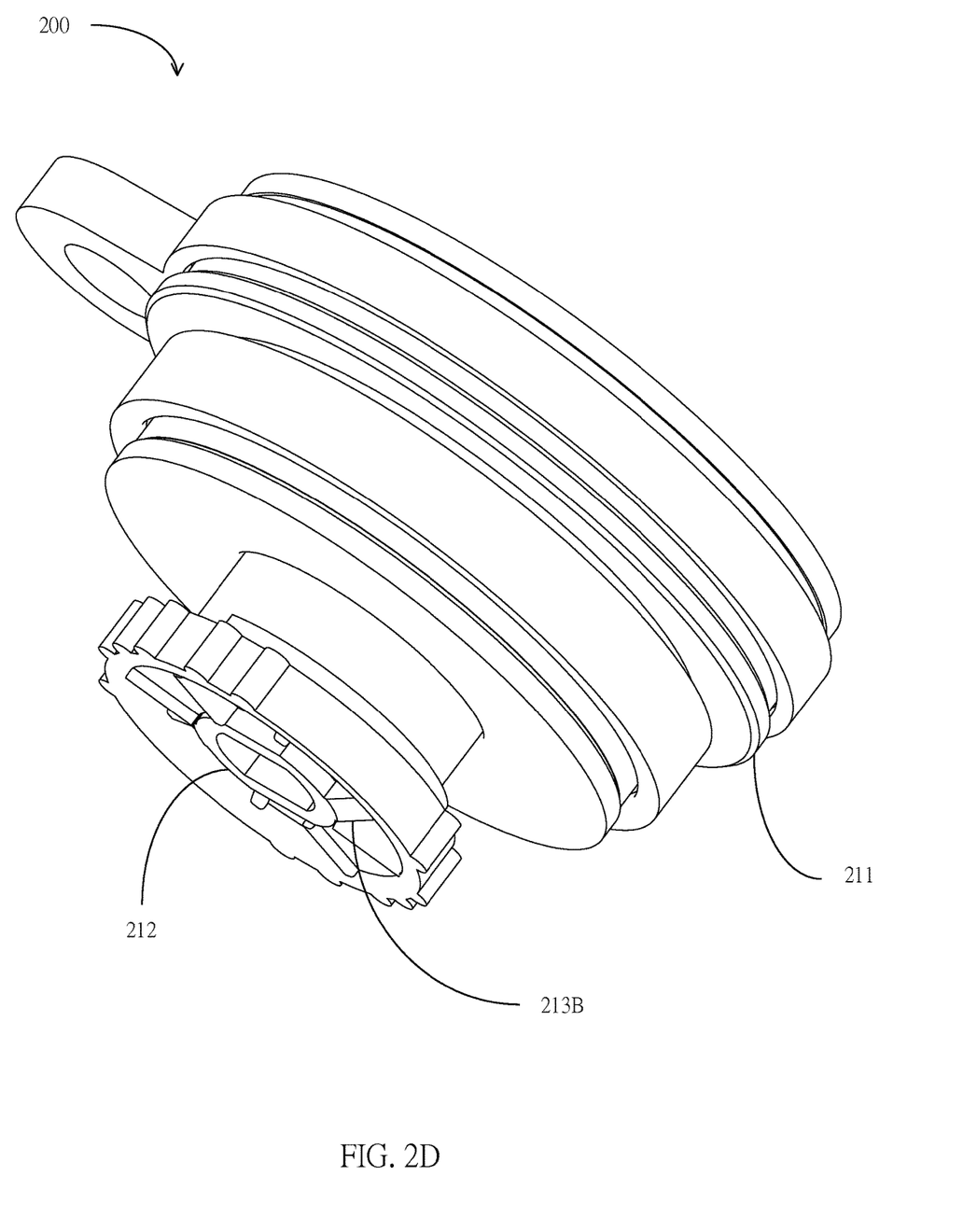
Figure 2E:
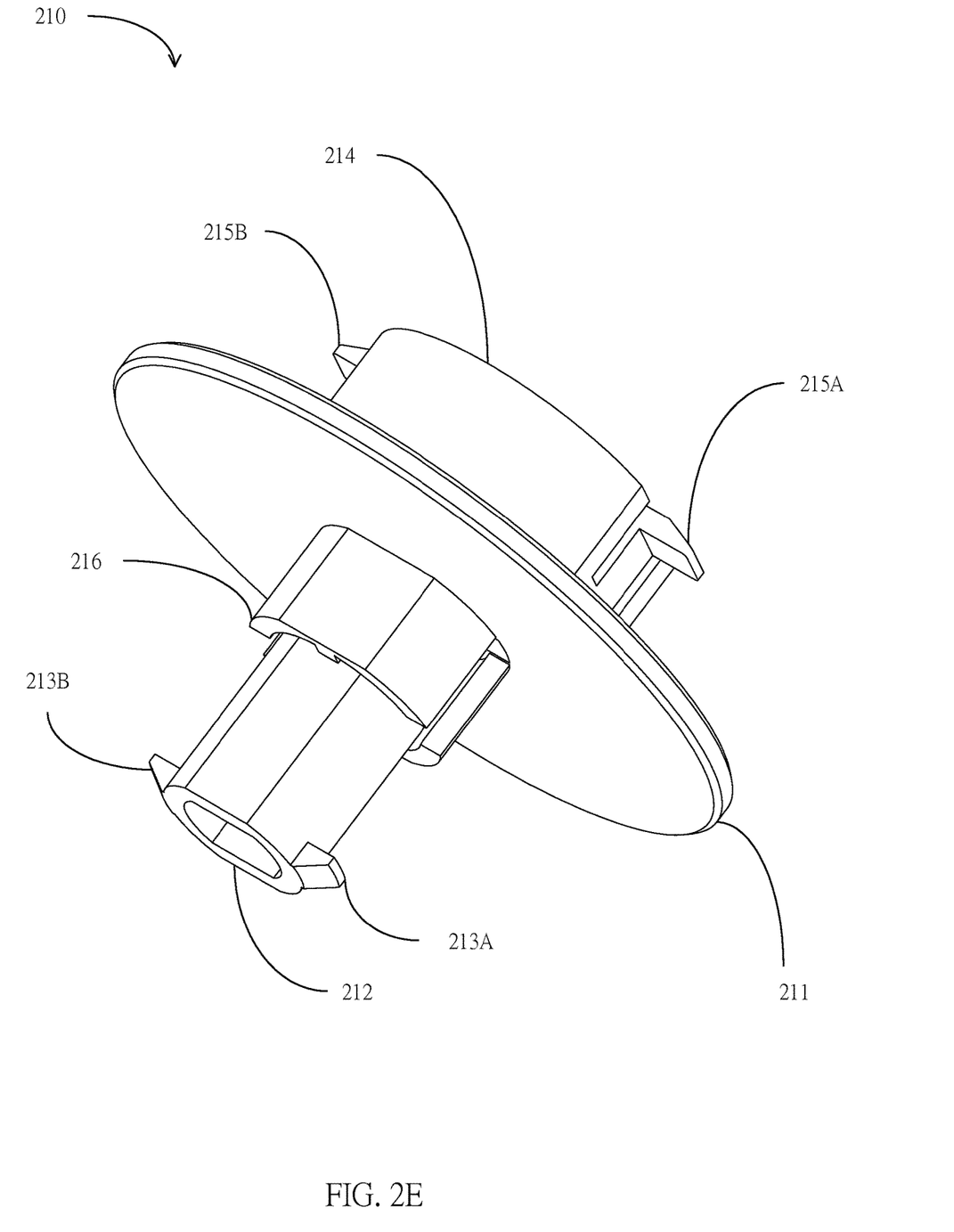
FIG. 2E is the space diagram of the intermediate connecting member 210.

Referring to the FIG. 2E, it is the space diagram of the intermediate connecting member 210. The intermediate connecting member 210 includes the separating plate 211, the first hollow columnar body 212 located on one side or on the down side of the separating plate 211 and the second hollow columnar body 214 located on the other side or on the upper side of the separating plate 211. The separating plate 211 can be round, the edge of the separating plate 211 can be rounded. As shown in FIG. 2E, the center axis which is perpendicular to the axis of the separating plate 211 can be the axis of the ribbon recycling wheel. The central axis of the first hollow columnar body 212 and the central axis of the second hollow columnar body 214 can be the central axis of the separating plate 211, and they also can be the axis of the ribbon recycling wheel. In the present invention, the axis of the recycling wheel can pass through the central axis of the intermediate connecting member 210.

The shape of the first hollow columnar body 212 can be round, and it also can have two straight edges as shown in the figure in order to connect and align with the other components. The underside opening of the first hollow columnar body 212 can comprise two opposite fastener 213A and 213B in order to install the first torque limiting module 300 from bottom to top and fix it.

The shape of the second hollow columnar body 214 can be round, and it also can have two straight edges in order to connect and align with the other components. The upside opening of the second hollow columnar body 214 can comprise two opposite fastener 215A and 215B in order to install the second torque limiting module 400 from bottom to top and fix it.

The underside of the intermediate connecting member 210 can comprise the third hollow columnar body 216, which is located on the outside of the first hollow columnar body 212. Or it can be said that the third hollow columnar body 216 embraces the third hollow columnar body 216, and they have the same central axis. As shown in figure, the length of the third hollow columnar body 216 is less than that of the first hollow columnar body 212. There can be a support bracket between the third hollow columnar body 216 and the first hollow columnar body 212, in order to enhance the strength of them. The shape of the third hollow columnar body 216 can be round, as shown in figure, it can have two cut edges and two gaps or solid retaining structure, in order to connect and align with the other components.

In this embodiment, the diameter of the second hollow columnar body 214 is greater than that of the third hollow columnar body 216, and the diameter of the third hollow columnar body 216 is greater than that of the first hollow columnar body 212. The technical personnel can understand this is just one example of this embodiment. One of the main spirits of the application is that through the first hollow columnar body 212, which is the same axis with the intermediate connecting member 210, and the second hollow columnar body 214 to connect and install the first torque limiting module 300 and the second torque limiting module 400, respectively. The length, the diameter and the shape of each hollow columnar body can be changed, as long as it can be achieved the goal. Similarly, the shape and the number of 213A, 213B, 215A and 215B are only one example in this embodiment. The technical personnel in this area can change the number, the size and the shape of the various components mentioned above in order to adapt to all kinds of applications.

Referring to the FIGS. 3A, 3B, 3C and 3D, this is the bottom view, the front view, the side view and the space diagram of the first torque limiting module 300 and the intermediate connecting member 210, respectively. The four figures of the intermediate connecting member 210 are shown the FIGS. 2A-2D without the second torque limiting module 400, respectively.

The first torque limiting module 300 connects and installs outside the aforementioned first hollow columnar body 212 and the third hollow columnar body 216 of the intermediate connecting member 210. The first torque limiting module 300 includes the first circular ring 311, the second circular ring 317, the first friction ring 315 and the second friction ring 316, which are outside the third hollow columnar body 216. The first circular ring 311 is connected to the separating plate 211 of the intermediate connecting member 210 and the second circular ring 317 by the first friction ring 315 and the second friction ring 316. The second circular ring 317 is fixed at the third hollow columnar body 216 by the two gaps or the fastening structure of the third hollow columnar body 216.

Because the second circular ring 317 is fixed to the third hollow columnar body 216, and the relative position of the third hollow columnar body 216 and the separating plate 211 is fixed. Therefore, the first circular ring 311 can connect the separating plate 211 and the second circular ring 317 by the first friction ring 315 and the second friction ring 316, respectively, and create the friction. In one example, the first friction ring 315 and the second friction ring 316 can be the wool felt. In the other example, the external material of the first friction ring 315 and the second friction ring 316 can contains the wool felt. The technical personnel in this area can understand that the material which the first friction ring 315 and the second friction ring 316 creating the proper static friction coefficient and dynamic friction coefficient is not limited to wool felt, but can be materials creating the proper static friction coefficient and dynamic friction coefficient such as leather, plastic, polymer materials and so on.

The first torque limiting module 300 also includes the first elastic element 312 and a bottom ring 313. The bottom ring 313 connects to the first hollow columnar body 212 of the intermediate connecting member 210. The fastener 213A and 213B at the bottom of the first hollow columnar body 212 can fix the bottom ring 313. The edge of the bottom ring 313 can have some bumps, in order to connect with the other components of the axis of the recycling wheel.

The dynamic principle of the first torque limiting module 300 is through the elastic force provided by the first elastic element 312, and the friction provided by the first friction ring 315 and the second friction ring 316, to limit the speed of the first circular ring 311 and the torsional moment within the first range, to make the recycling wheel maintain the speed at the first range in the ribbon recycling direction, and to provide the proper first tension to the ribbon.

Referring to FIGS. 4A, 4B, 4C, 4D and 4E, this is the bottom view, the front view, the side view, the space diagram and the explosive view of the second torque limiting module 400 and the intermediate connecting member 210, respectively. The first four figures are shown the FIG. 2A-2D without the first torque limiting module 300, respectively.

The second torque limiting module 400 includes the third circular ring 420 and the fourth circular ring 440, which is used to connect and install with the second hollow columnar body 214 of the intermediate connecting member 210. The outer rim of the third circular ring 420 includes the bumps, the two sides of the inner ring flange 426 also includes the bumps, which make the third circular ring 420 contain parts of the third friction ring 410 and the fourth friction ring 430. The inner rim of the fourth circular ring 440 includes two straight-sided 442 of the fasteners 215A and 215B of the second hollow columnar body 214. This can make the third friction ring 410, the third circular ring 420, the fourth friction ring 430 and the fourth circular ring 440 buckle outside of the second hollow columnar body 214 by the fasteners 215A and 215B.

The fourth circular ring 440 can contain a larger diameter rim 444 on the upper outer side. The second torque limiting module 400 includes the second elastic element 450 which is configured outside of the second hollow columnar body 214 and the inside of the fourth circular ring 440. The outside of the third circular ring 420 can contain the third circular ring fixed member 422, which is used to connect the third circular ring 420 to the printer. As shown in figure, the third circular ring fixed member 422 contains the fixed hole 424, which can connect the third circular ring 420 to the printer by the cylinder or the bolt. The technical personnel in this area can understand, although the application use the third circular ring fixed member 422 as an example, it can use a number of fixed member or other ways to connect the third circular ring 420 to the printer. In addition, the outer rim of the third circular ring 420 may not be round.

Because the fourth circular ring 440 and the second hollow columnar body 214, namely the intermediate connecting member 210, is fixed same. The friction provided by the third friction ring 410 and the fourth friction ring 430, the elastic force provided by the second elastic element 450, the middle of the third circular ring 420 and the intermediate connecting member 210 can maintain proper tension. More broadly, the third circular ring 420 connects with the printer by the third circular ring fixed member 422, therefore, the rotate speed of the printer and the torque limiter 200 can maintain in the second speed range, which can make the ribbon maintain the second tension.

The first speed range is the first circular ring 311 and the intermediate connecting member 210, namely the rotate speed of the torque limiter 200, and it can be the rotation direction when the ribbon recycling. On the contrary, the second speed range is the second circular ring 420 and the intermediate connecting member 210, namely the rotate speed of the torque limiter 200, and it can be the rotation direction when the ribbon back. According to the different examples, we can adjust the first speed range and the second speed range, namely to adjust the first tension when the ribbon recycling and to adjust the second tension when the ribbon back, making the colour not pollute on the paper when the ribbon back.

The technical personnel in this area can understand that the first speed range and the first tension can be adjusted by adjusting the elasticity of the first elastic element 312, the friction coefficient of the first friction ring 315 and/or the second friction ring 316. And the second speed range and the second tension can be adjusted by adjusting the elasticity of the second elastic element 450, the friction coefficient of the third friction ring 410 and/or the fourth friction ring 430. In addition, the friction coefficient is decided by the friction surface on both sides. Therefore, it also can adjust the first speed range and the second speed range by adjusting the surface of the separating plate 211, the first circular ring 311, the second circular ring 317, the third circular ring 420 and/or the fourth circular ring 440, so that to adjust the first tension and the second tension.

Figure 5A:
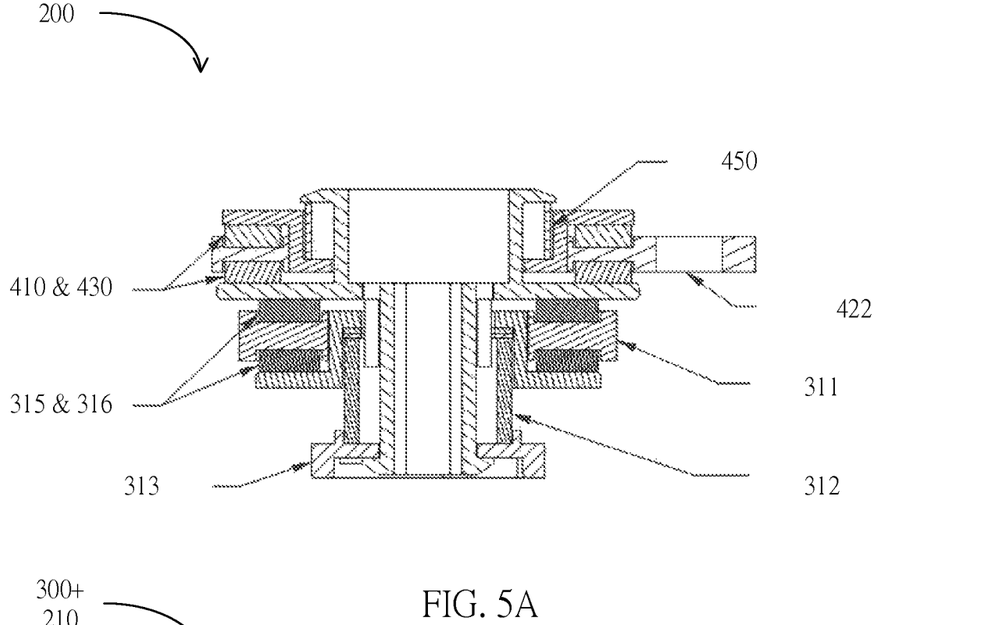
FIGS. 5A and 5B is the profile of the torque limiter 200, the first torque limiting module 300 and the intermediate connecting member 210, respectively.
Figure 5B:
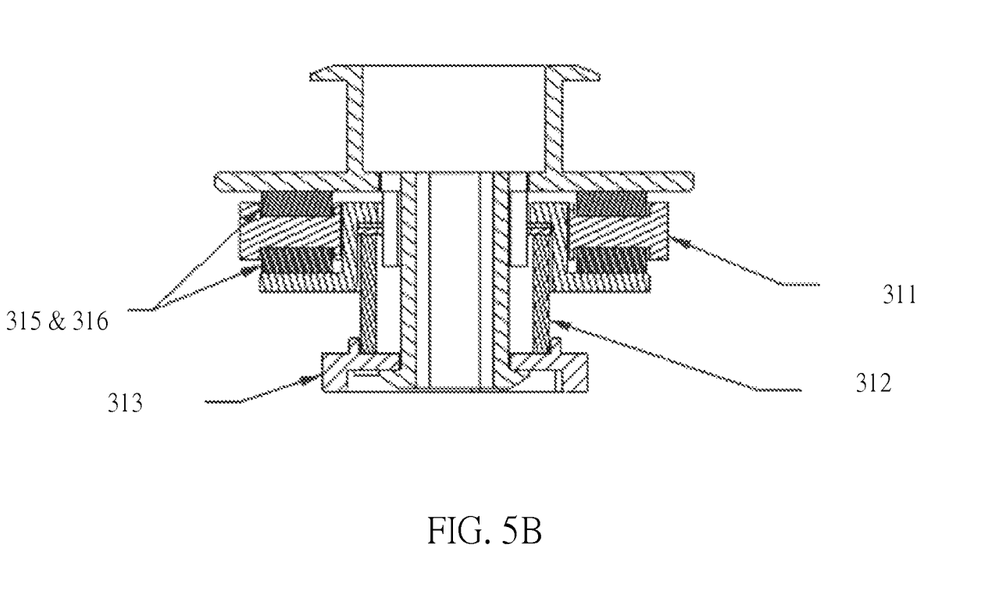

Referring to FIGS. 5A and 5B, this is the profile view of the torque limiter 200, the first torque limiting module 300 and the intermediate connecting member 210. From the two figures, the first circular ring 311 can connect with the separating plate 211 and the second circular ring 317 by the first friction ring 315 and the second friction ring 316, respectively. The third circular ring 420 can connect with the separating plate 211 and the fourth circular ring 440 by the third friction ring 410 and the fourth friction ring 430, respectively.

Figure 6:
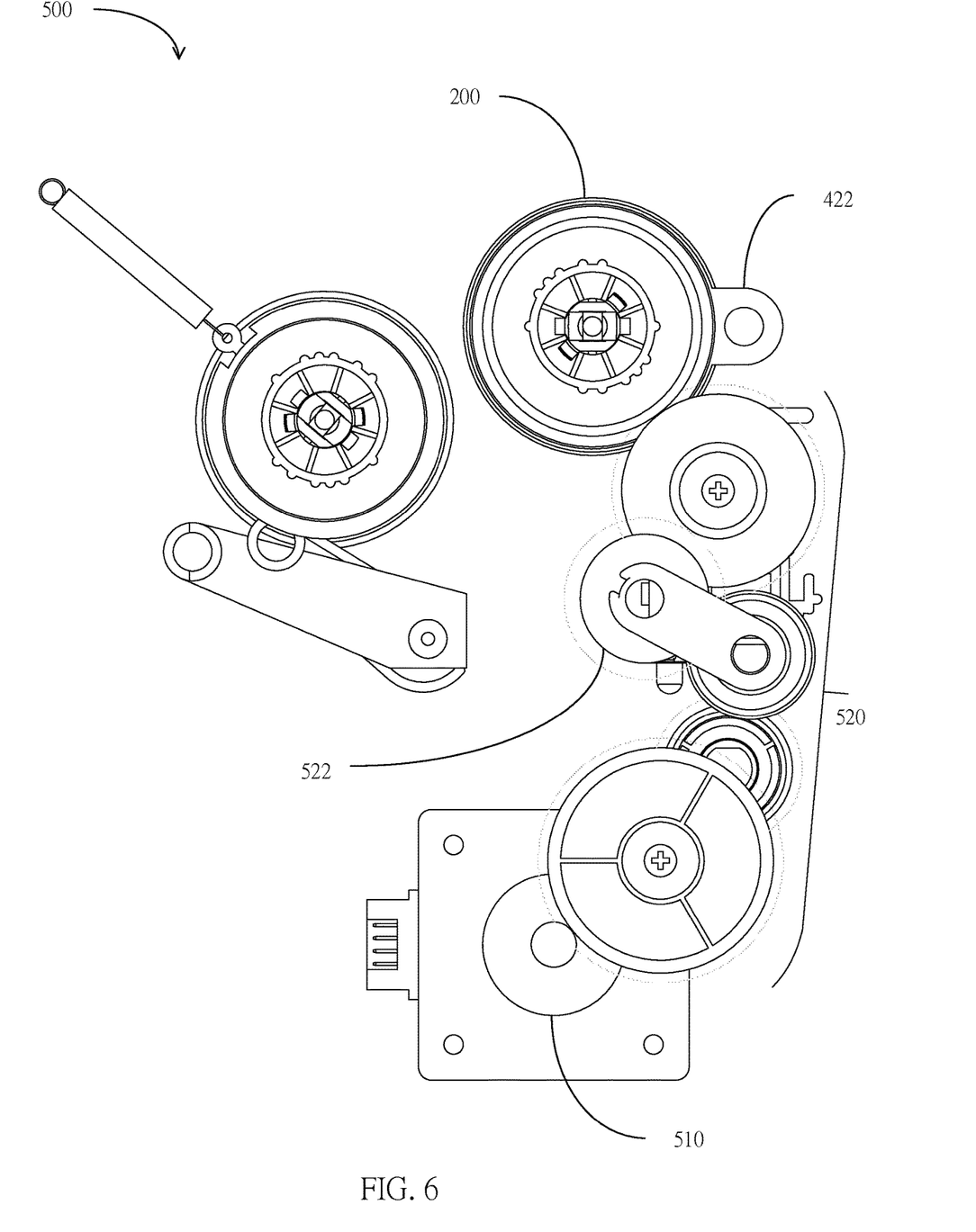
FIG. 6 is the profile of printer 500.

Referring to FIG. 6 is an internal profile of the printer 500 according to one embodiment. For the sake of convenience, the FIG. 6 omits many components within the printer 500. The printer 500 includes the driving gear 510, the gear-set 520 connected with the driving gear 510 and the torque limiter 200 connected with the axis of the ribbon recycling wheel. The gear-set 520 includes a gear for driving the roller and the swinging gear 522. The driving gear 510 can be directly coupled to a motor shaft. In addition, the third circular ring fixed member 422 of torque limiter 200 connects to the printer 500.

The gear-set 520 is coupled to the first circular ring 311 of the torque limiter 200 when the paper forward. Because the mechanism design of the first circular ring 311 and the torque limiter 200, which make the rotate speed of the torque limiter 200 and the ribbon recycling wheel at the first speed range, and maintain the first tension of the ribbon recycling wheel.

On the contrary, when the paper and the ribbon back, the driving gear 510 drives the gear-set 520 reversely, making the swinging gear 522 driven, and make the gear-set 520 separate from the first circular ring 311 of the torque limiter 200. So that the gear-set 520 is no longer coupled to the first torque limiting module 300 of the torque limiter 200. However, the third circular ring fixed member 422 of the torque limiter 200 connects to somewhere of the printer 500 to have the second torque limiting module 400 make effort. Therefore, the rotate speed between the printer and the torque limiter 200 can maintain in the second speed range, which can maintain the second tension of the back ribbon and not to leave the colour on the paper.

In the previous technology, the axial structure of the original torque limiter 112 and the recycling wheel 114 is integrated, it cannot be easily removed when repairing. According to the embodiment, the torque limiter 200 can easily be separated from the recycling wheel 114 and the printer 500. Because the elastic components and the friction parts of the torque limiter 200 have the lifetime limitation, it cannot provide proper speed range and ribbon tension due to the abrasion from usage. The maintenance personnel can easily change the torque limiter 200 when the lifetime expired or the torque limiter 200 lost. The manufacturer of the printer 500 can produce more torque limiter 200 as additive and as online Line Replace Unit according to the difference between the lifetime of the printer 500 and the torque limiter 200.

According to one embodiment of the present invention provides a torque limiter which includes a first torque limiting module for limiting a first torque with regard to a rotating direction and a second torque limiting module for limiting a second torque with regard to a counter direction of the rotating direction.

According to one embodiment of the present invention provides a torque limiter, wherein the first torque is greater than the second torque.

According to one embodiment of the present invention provides a torque limiter, wherein the torque limiter also comprises an intermediate connecting member, wherein the first torque limiting module is configured on one side of the intermediate connecting member, the second torque limiting module is configured on the other side of the intermediate connecting member, wherein the first torque limiting module is coaxial with the second torque limiting module.

According to one embodiment of the present invention provides a torque limiter, wherein the first torque limiting module is configured surround outside a first hollow columnar body and a third hollow columnar body of the intermediate connecting member, wherein the first hollow columnar body is coaxial with the third hollow columnar body, and the diameter of the third hollow columnar body is greater than that of the first hollow columnar body.

According to one embodiment of the present invention provides a torque limiter, wherein the first torque limiting module comprises a first circular ring, a second circular ring, a first friction ring, a second friction ring and a first elastic element, wherein the first circular ring connected to a separating plate of the intermediate connecting member and the second circular ring by the first friction ring and the second friction ring, wherein the second circular ring is connected with the third hollow columnar body fixedly, wherein the first elastic element is configured inside the inner ring rim of the second circular ring, wherein the elastic force provided by the first elastic element, the friction force provided by the first friction ring and the second friction ring, can limit the first torque of intermediate connecting member in the direction of rotation by the first circular ring.

According to one embodiment of the present invention provides a torque limiter, wherein the first torque limiting module comprises a bottom ring, at least one fastener is configured at the end of the first hollow columnar body, to make the first friction ring, the first circular ring, the second friction ring, the second circular ring, the first elastic element and the bottom ring sequentially buckled in the outer edge of the first hollow columnar body and the third hollow columnar body.

According to one embodiment of the present invention provides a torque limiter, wherein the surface of the first friction ring and the second friction ring contains wool felt.

According to one embodiment of the present invention provides a torque limiter, wherein the second torque limiting module comprises a third circular ring, a fourth circular ring, a third friction ring, a fourth friction ring and a second elastic element, wherein the third circular ring is connected with the separating plate of the intermediate connecting member and the fourth circular ring by the third friction ring and the fourth friction ring, wherein the fourth circular ring is connected with the second hollow columnar body fixedly, the first elastic element is configured on the inner side of the fourth circular ring, wherein the elastic force provided by the second elastic element and the friction force provided by the third friction ring and the fourth friction ring for limiting the second torque with regard to a counter direction of the rotating direction of the intermediate connecting member by the third elastic element.

According to one embodiment of the present invention provides a torque limiter, wherein the third circular ring comprises at least one fixed member of the third circular ring, for connecting to the third circular ring in a position fixedly.

According to one embodiment of the present invention, the second hollow columnar body comprises at least one fastener at the tail end, for buckling the third friction ring, the third circular ring, the fourth friction ring and the second elastic element sequentially at the outer edge of the second hollow columnar body.

According to one embodiment of the present invention, the outer ring flange and the inner ring flange of the third circular ring contain bumps, makes at least a portion of the third friction ring and the fourth friction ring accommodated between the outer ring flange and the inner ring flange of the third circular ring.

According to one embodiment of the present invention, the surface of the third friction ring and the fourth friction ring contains wool felt.

According to one embodiment of the present invention, the intermediate connecting member is connected with a ribbon recycling wheel, the intermediate connecting member is coaxial with the recycling wheel.

According to one embodiment of the present invention provides a printer, comprise: a ribbon recycling wheel; a torque limiter connected to the ribbon recycling wheel, a gear-set including a swinging gear; and a driving gear driven by the gear-set, wherein the torque limiter comprising: a first torque limiting module for limiting a first torque with regard to a rotating direction; and a second torque limiting module for limiting a second torque with regard to a counter direction of the rotating direction; when the driving gear drives the gear-set in a driving direction, the swinging gear is coupled to the first torque limiting module, makes the ribbon recycling wheel limited by the first torsion, when the driving gear drives the gear-set in opposite of the driving direction, the swinging gear separates from the first torque limiting module, making the ribbon recycling wheel limited by the second torsion.

According to one embodiment of the present invention, the torque limiter contains an intermediate connecting member connected to the ribbon recycling wheel, the second torque limiting module comprises a third circular ring, a fourth circular ring, a third friction ring, a fourth friction ring and a second elastic element, wherein the third circular ring is connected with the separating plate of the intermediate connecting member and the fourth circular ring by the third friction ring and the fourth friction ring, wherein the fourth circular ring is connected with the second hollow columnar body fixedly, the first elastic element is configured inside the inner ring flange of the fourth circular ring, wherein the elastic force provided by the second elastic element and the friction force provided by the third friction ring and the fourth friction ring for limiting the second torque with regard to a counter direction of the rotating direction of the intermediate connecting member by the third elastic element.

According to one embodiment of the present invention, the third circular ring comprises at least one fastener of the third circular ring, for connecting to the third circular ring in a position fixedly.

According to one embodiment of the present invention provides a gear-set of the printer, used to connect the torque limiter connected to the ribbon recycling wheel of the printer, wherein the torque limiter comprising: a first torque limiting module for limiting a first torque with regard to a rotating direction; and a second torque limiting module for limiting a second torque with regard to a counter direction of the rotating direction; the gear-set including a swinging gear; when the driving gear drives the gear-set in a driving direction, the swinging gear is coupled to the first torque limiting module, making the ribbon recycling wheel limited by the first torsion, when the driving gear drives the gear-set in opposite of the driving direction, the swinging gear separates from the first torque limiting module, making the ribbon recycling wheel limited by the second torsion.

SYMBOL DESCRIPTION 100 traditional printer
110 ribbon
112 torque limiter
114 recycling wheel
116 unlocking wheel
120 paper
130 platen
200 torque limiter
210 intermediate connecting member
211 separating plate
212 the first hollow columnar body
213A, 213B fastener
214 the second hollow columnar body
215A, 215B fastener
216 the third hollow columnar body
300 the first torque limiting module
311 the first circular ring
312 the first elastic element
313 bottom ring
314 bump
315 the first friction ring
316 the second friction ring
317 the second circular ring
400 the second torque limiting module
410 the third friction ring
420 the third circular ring
422 the third circular ring fixed member
424 fixed hole
426 inner ring flange
430 the fourth friction ring
440 the fourth circular ring
442 straight-sided
444 rim
450 the second elastic element

What is claimed is:

1. A torque limiter, comprising:
a first torque limiting module for limiting a first torque with regard to a rotating direction;
a second torque limiting module for limiting a second torque with regard to a counter direction of the rotating direction, wherein the second torque limiting module comprises a third circular ring, a fourth circular ring, a third friction ring, a fourth friction ring and a second elastic element; and
an intermediate connecting member, wherein the first torque limiting module is configured on one side of the intermediate connecting member, the second torque limiting module is configured on the other side of the intermediate connecting member, wherein the third circular ring is connected with a separating plate of the intermediate connecting member and the fourth circular ring by the third friction ring and the fourth friction ring, wherein the fourth circular ring is connected with a second hollow columnar body of the intermediate connecting member fixedly, the second elastic element is configured inside the inner ring flange of the fourth circular ring.

2. A torque limiter according to claim 1, wherein the first torque is greater than the second torque.

3. A torque limiter according to claim 1, wherein the first torque limiting module is coaxial with the second torque limiting module.

4. A torque limiter according to claim 1, wherein the first torque limiting module is configured surround outside a first hollow columnar body and a third hollow columnar body of the intermediate connecting member, wherein the first hollow columnar body is coaxial with the third hollow columnar body, and the diameter of the third hollow columnar body is greater than that of the first hollow columnar body.

5. A torque limiter according to claim 4, wherein the first torque limiting module comprises a first circular ring, a second circular ring, a first friction ring, a second friction ring and a first elastic element, wherein the first circular ring connected to the separating plate of the intermediate connecting member and the second circular ring by the first friction ring and the second friction ring, wherein the second circular ring is connected with the third hollow columnar body fixedly, wherein the first elastic element is configured inside the inner ring flange of the second circular ring.

6. A torque limiter according to claim 5, wherein the elastic force provided by the first elastic element, the friction provided by the first friction ring and the second friction ring can limit the first torque of intermediate connecting member in the direction of rotation by the first circular ring.

7. A torque limiter according to claim 5, wherein the first torque limiting module comprises a bottom ring, at least one fastener is configured at the end of the first hollow columnar body, to make the first friction ring, the first circular ring, the second friction ring, the second circular ring, the first elastic element and the bottom ring sequentially buckled in the outer edge of the first hollow columnar body and the third hollow columnar body.

8. A torque limiter according to claim 5, wherein the surface of the first friction ring and the second friction ring contains wool felt.

9. A torque limiter according to claim 1, wherein the intermediate connecting member is connected with a recycling wheel of a ribbon, the intermediate connecting member is coaxial with the recycling wheel.

10. A torque limiter according to claim 1, wherein the elastic force provided by the second elastic element and the friction force provided by the third friction ring and the fourth friction ring for limiting the second torque with regard to a counter direction of the rotating direction of the intermediate connecting member by the third elastic element.

11. A torque limiter according to claim 10, wherein the third circular ring comprises at least one fastener of the third circular ring, for connecting to the third circular ring in a position fixedly.

12. A torque limiter according to claim 10, wherein the second hollow columnar body comprises at least one fastener, for buckling the third friction ring, the third circular ring, the fourth friction ring and the second elastic element sequentially at the outer edge of the second hollow columnar body.

13. A torque limiter according to claim 10, wherein the outer ring flange and the inner ring flange of the third circular ring contains bumps, makes at least a portion of the third friction ring and the fourth friction ring accommodated between the outer ring flange and the inner ring flange of the third circular ring.

14. A torque limiter according to claim 10, wherein the surface of the third friction ring and the fourth friction ring contains wool felt.

* * * * *